No. 815,650. PATENTED MAR. 20, 1906.
E. C. SMITH.
SHIFTING DEVICE.
APPLICATION FILED NOV. 17, 1904.

WITNESSES:
H. M. Gillman, Jr.
Thos. Howe

INVENTOR.
Edwin C. Smith
By Foster, Freeman & Watson,
Attorneys

UNITED STATES PATENT OFFICE.

EDWIN C. SMITH, OF PROVIDENCE, RHODE ISLAND.

SHIFTING DEVICE.

No. 815,650. Specification of Letters Patent. Patented March 20, 1906.

Application filed November 17, 1904. Serial No. 233,178.

*To all whom it may concern:*

Be it known that I, EDWIN C. SMITH, a citizen of the United States, residing in Providence, in the county of Providence and State of Rhode Island, have invented certain new and useful Improvements in Shifting Devices, of which the following is a specification.

My invention relates to devices for shifting belts or other mechanical elements that must be shifted alternately between two positions.

Figure 1:
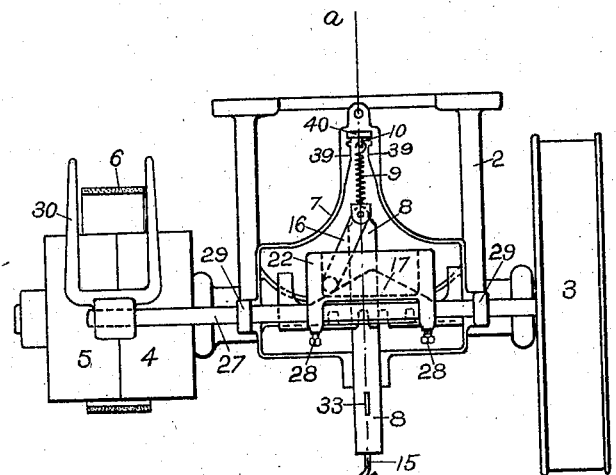
Figure 2:
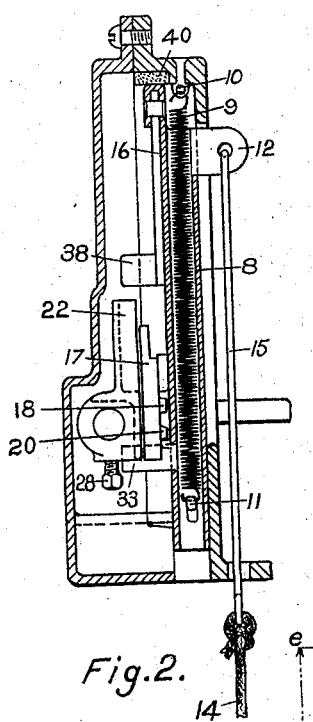
Figure 3:
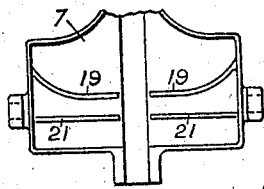
Figure 4:
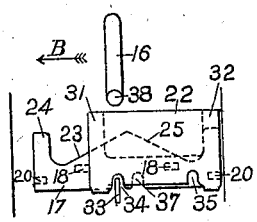
Figure 5:
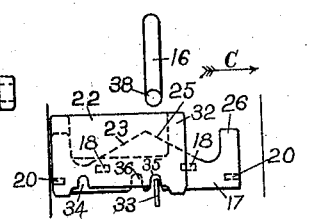
Figure 6:
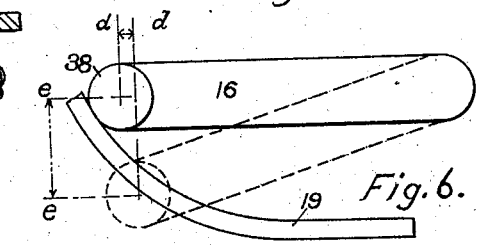
Figure 7:
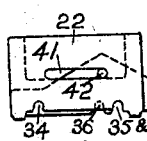

Of the accompanying drawings, Figure 1 shows my novel device applied to a counter-shaft of usual structure; Fig. 2, a section on the line *a a;* Fig. 3, a partial view of the case 7; Figs. 4, 5, and 6, diagrammatic views to illustrate different relations of the elements of the invention; Fig. 7, a modification.

In Fig. 1 of the drawings above referred to, 2 is the frame of the counter-shaft to which my device is shown attached, which frame in the construction shown is a shaft-hanger. 3 is the driving-pulley, and 4 and 5 are the tight and loose pulleys, from one to the other of which the belt 6 must be shifted to start or to stop the operation of the counter-shaft. Attached to the counter-shaft frame 2 is the case 7, in which is the slide 8, held upward by the spring 9. This spring is hung from a hook or eye 10 at the top of the slideway in the frame and is suitably attached to the slide 8, as by the ear 11, (an integral part of the slide.) On the rear of the slide 8 is a lug or ear 12, to which is attached the handle 13, preferably by the cord 14 and the wire or rod 15. At the top of the slide and at the front is shown a pawl 16 in the form of a pendulum. Mounted in the case to slide transversely of the slide 8 is a cam or switch 17. Projections 18 18 engage the ledge or track 19 on the case 7, and projections 20 20 engage the ledge or track 21 to prevent vertical movement and control the position of the cam 17. This cam 17 is held against the case and in engagement with the said tracks 19 and 21 by the shipper-slide 22, which will be later described. The cam 17 is made slightly shorter than the width of the case 7 to have a limited longitudinal movement therein. The purpose of the cam 17 is to control the movement of the pawl 16.

With the parts in position indicated by Fig. 4 the end of the pawl is carried by a downward movement of the slide 8 to descend and follow the incline 23 until it reaches the vertical post 24 of the cam. Acting on this, the pawl pushes the cam to the limit of its movement in that direction. When the slide 8 is raised by the spring 9, the pawl then hangs over the incline 25, as indicated in Fig. 5, and when the slide 8 again descends the pawl engages this incline as before it engaged the incline 23, and when it approaches the other extreme of its travel it presses against the post 26 and again shifts the cam. Thus is the pawl caused to act first in the direction of the arrow B and then in the direction of the arrow C. Directly in front of the cam 17 is the shipper-slide 22, secured to the shipper-rod 27, as by the screws 28 28. The shipper-rod extends through and has bearings in the ears 29 29, projections from the case 7, and carries at its opposite end the belt-shipper 30. This shipper-slide 22 has a material movement in the case 7, it being so proportioned that the sides of the case or cover—in this instance of the cover—limit its extreme movement. When at either extreme of movement, the post 31 or the post 32 is in such position that when the pawl descends it comes between one of the inclines of the cam and one of said posts. Then it is that the member 17 really acts as a cam, forcing the pawl to one side and causing it to carry the shipper-slide with it.

Fig. 4 shows the parts where the cam surface or incline 23 causes the pawl to engage the post 31 of the shipper-slide and carry it in the direction of the arrow B. Fig. 5 shows the parts when the cam surface or incline 25 causes the pawl to engage the post 32 of the shipper-slide and carry it in the direction of the arrow C. To prevent displacement of both the cam 17 and the shipper-slide 22 from the position to which they may have been set, a lock or projection 33 is formed on the front of the silde 28. The shipper-slide is provided with recesses 34 and 35 and the cam with recesses 36 and 37. When the shipper-slide 22 and the cam 17 are at one extreme of travel, the recess 34 of the shipper-slide registers with the recess 36 of the cam. When at the opposite extreme of travel, the recess 35 of the shipper-slide registers with the recess 37 of the cam, and the lock 33, entering the registering recesses, secures both shipper-slide and cam in position until the slide 8 is drawn downward again, when the lock 33 leaves them free to move under action of the pawl 16. To effect engagement of the pawl 16 with both the cam 17 and the shipper-slide 22, its extremity is provided with a projection 38, which may be a fixed stud or a roll, as desired. To insure that whenever the pawl 16 is returned to its uppermost position it shall properly aline with the cam 17, the space between the sides of the case 7 at 39 39 is contracted, so as to engage the sides of the pawl 16 and cause it to assume its appropriate place.

A further novel feature whereby a maximum deflection of the pawl 16 is secured, and thereby a maximum movement of the shipper-slide 22, lies in the relation of the pawl to the track 19. This track 19 is upturned at each end, so that when the extremity or the projection 38 of the pawl has been deflected a certain distance, it engages this upturned track, which latter adds an upward to its lateral movement. When, therefore, the slide 8 has been pulled to its lowermost position, the pawl is horizontal, thus attaining a maximum lateral movement of the engaging parts with a minimum of movement of the slide 8. This is clearly illustrated in Fig. 6, the full-line representation of the pawl 16 representing its ultimate position as secured by the upturned track 19. The dotted-line representation of the pawl indicates the result that would be secured were the track not upturned. By the upturn there is imparted to the extremity or projection 38 of the pawl a movement (indicated by $d\ d$) which without the upturn could only have been secured by an added vertical movement of the slide 8, (indicated by $e\ e$.) It is a manifest advantage in a device of this character that the functions be performed with as little movement of the handle as possible. To relieve the shock of return of the slide 8 by the spring 9, a buffer 40 is secured in the case just above the top of the slide. This may be of leather, rubber, or other suitable material. The complete coaction of the parts is then as follows: The pawl being in normal position—as, for example, that indicated in Fig. 4—the handle 13 is pulled down, carrying with it the slide 8. The extremity 38 of the pawl engages the incline 23 of the cam 17 and is deflected in the direction of the arrow B and engaging the post 31 of the shipper-slide 22 shifts the latter also. At about the midpoint of its deflection this pawl extremity 38 engages the upturn of the track 19 and rising imparts the additional movement, (indicated by $d\ d$, Fig. 6.) As it approaches the end of its lateral movement it engages the post 24 of the cam 17 and so shifts it as to bring the incline 25 beneath the normal position of the pawl 16. The latter is then returned by the spring 9 to its normal position. The next time the handle 13 is pulled down the pawl engages the incline 25 and, as before, is deflected, but in the direction of the arrow C. It engages the upturn of the track 19 and then rises coincidently with its deflection, carrying by its post 32 the shipper-slide 22 and when it reaches it the cam 17 by its post 26. The movement of the shipper-slide 22 is communicated through the shipper-rod 27, on which it is secured, to the shipper 30 and to the belt 6.

Obviously the form and arrangement of parts may be materially varied and without removing the resulting structure from the scope of the invention. For example, as indicated in Fig. 7, the shifting of the cam 17 need not be directly performed by the pawl as above described—that is, not by direct engagement with the pawl. In this case the shipper-slide 22 has a slot 41, with which engages a projection 42 from the cam 17. As the shipper-slide approaches the end of its movement in either direction it engages the projection 42 and shifts the cam. The member 38 might have a straight-line connection with the slide 8 instead of a pendulous connection, and so, also, might other modifications be made.

The construction described is my preferred one.

It is also obvious that the above-described invention is not limited in its scope to application to counter-shafts, but can be employed on machines or in conjunction with other devices where an action is desired similar to that of the shipper 30.

Therefore, without limiting myself to the precise form or arrangement of parts indicated, I claim—

1. The combination with a slidable member and a pawl mounted thereon, of a cam to deflect the pawl, and a second slidable member engaged and moved by the pawl in its deflection.

2. The combination with a belt-shipper and rod therefor, of a slide secured to said rod, a pawl to move the slide, and means to actuate the pawl including a cam to effect its deflection, a slide to carry the pawl, and a handle to move the slide.

3. The combination with a belt-shipper and rod therefor, of a slide, a pawl to move the slide, and a cam to initiate a deflection of the pawl and later to be shifted by it, and means to move the pawl.

4. The combination with a belt-shipper 30 and shipper-rod 27, of the shipper-slide 22 having posts 31 and 32, and recesses 34 and 35, a cam having posts 24 and 26, and recesses 36 and 37, a slide 8, having a projection 33 to engage either the recesses 34 and 36 or 35 and 37, and a pawl coacting with the slide 8 and the cam 17 to shift the shipper-slide 22 in the manner described.

5. The combination of a movable member adapted to move initially in a straight line in one direction, and a second member supported to move in a straight line in a different direction, with means separate from and independent of the second member whereby the first is deflected from its initial direction of movement to actuate the second member.

6. The combination with a movable member adapted to move initially in a straight line in one direction and a second member to be reciprocated between extremes, and on a straight path of different direction from that of the initial movement of the first member, of means separate from the second member, to deflect the movement of the first from its initial path, to engage and move the second member reciprocally as described.

7. The combination with a movable member adapted to move initially in one direction, of means to first deflect it laterally from its initial direction, and means to combine with the lateral deflection a movement the reverse of the initial movement, as described, to secure the maximum deflection of the said member with a minimum of movement in the direction of its initial motion.

8. The combination with a movable member adapted to move initially in one direction, of a second member supported to move in a different direction, and means to so deflect the first member from the direction of its initial motion that it first moves the second member, and before completing the movement of said member, causes the deflecting means to be shifted in its position.

9. The combination with a member adapted to have a definite extent of movement and a member to cause such movement, of one means to move the second member to partially accomplish the movement of the first, and other means to complete the said movement.

10. The combination with a member adapted to have a definite extent of movement, of a pawl to move said member, means to direct the pawl to partially accomplish said movement, and other means to direct the pawl to complete it.

11. The combination with one member adapted to have a back-and-forth movement and second movable member capable of an initial motion in a direction different from that of the first member, of means separate from each member for so deflecting the motion of the second that it acts in the line of motion of the first, but in alternately-opposite directions to impart to it its back-and-forth movement.

12. The combination with a belt-shipper and rod therefor, of a shipper-slide upon the rod, a second slide and handle therefor, a pawl mounted on the second slide and adapted to engage the shipper-slide, a cam to deflect the pawl and cause such engagement, a track to extend the deflection of the pawl, and means to lock the shipper-slide in its extremes of movement.

13. The combination with a movable member and a second member movable thereon, of a third member acted on and moved by the second and a fourth member to determine the direction of action of the second.

14. The combination with a movable member and a second member movable thereon, of a third member acted on by the second and reciprocated by it within a certain range of movement, a fourth member to determine the direction of action of the second, and means to lock the third member at either extreme of its range so that it may not move except upon the movement of the first member.

15. The combination with a movable member and a second member movable thereon, of a third member acted on by the second and reciprocated by it within a certain range of movement, a fourth member to determine the direction of action of the second, and means to lock the third and fourth in position so they may not move except upon the movement of the first member.

16. The combination with a belt-shipper and rod therefor, of a shipper-slide upon the rod, a second slide and handle therefor, a cam, a pawl mounted upon the second slide and adapted to first engage the cam, then engage and shift the shipper-slide causing, toward the end of movement of the shipper-slide, the shifting of said cam, a track to impart to the pawl a further movement to extend its range of action, and means to lock the shipper-slide and cam when they are shifted.

In testimony whereof I have signed my name to this specification in the presence of two subscribing witnesses.

EDWIN C. SMITH.

Witnesses:
CHARLES A. EDDY,
THOMAS M. CHILDS.